US008919410B2

(12) United States Patent
Kappesser et al.

(10) Patent No.: US 8,919,410 B2
(45) Date of Patent: Dec. 30, 2014

(54) SMALL FLAT COMPOSITE PLACEMENT SYSTEM

(71) Applicants: Randall A. Kappesser, Cincinnati, OH (US); Michael A. Noel, Sunman, OH (US); Richard A. Curless, Cincinnati, OH (US); Daniel D. Janka, Loveland, OH (US)

(72) Inventors: Randall A. Kappesser, Cincinnati, OH (US); Michael A. Noel, Sunman, OH (US); Richard A. Curless, Cincinnati, OH (US); Daniel D. Janka, Loveland, OH (US)

(73) Assignee: Fives Machining Systems, Inc., Fond du Lac, WI (US)

(*) Notice: Subject to any disclaimer, the term of this patent is extended or adjusted under 35 U.S.C. 154(b) by 0 days.

(21) Appl. No.: 13/787,872

(22) Filed: Mar. 7, 2013

(65) Prior Publication Data
US 2013/0233471 A1 Sep. 12, 2013

Related U.S. Application Data

(60) Provisional application No. 61/608,440, filed on Mar. 8, 2012.

(51) Int. Cl.
*B29C 70/38* (2006.01)
*B32B 37/00* (2006.01)

(52) U.S. Cl.
CPC ............. *B32B 37/0046* (2013.01); *B29C 70/38* (2013.01)
USPC ............................ 156/574; 156/523; 156/538

(58) Field of Classification Search
CPC .. B29C 70/382; B29C 70/384; B29C 70/386; B29C 70/388
USPC .......................... 156/350, 433, 523, 538, 574
See application file for complete search history.

(56) References Cited

U.S. PATENT DOCUMENTS

| 3,574,040 | A | * | 4/1971 | Chitwood et al. ............. 156/522 |
| 4,292,108 | A | * | 9/1981 | Weiss et al. .................... 156/259 |
| 4,351,688 | A | | 9/1982 | Weiss et al. |
| 4,365,135 | A | | 12/1982 | McWilliams |
| 4,560,433 | A | | 12/1985 | Frank |
| 4,943,338 | A | | 7/1990 | Wisbey |
| 5,213,646 | A | | 5/1993 | Zsolnay et al. |
| 5,580,413 | A | | 12/1996 | Assink et al. |
| 5,936,861 | A | | 8/1999 | Jang et al. |

(Continued)

FOREIGN PATENT DOCUMENTS

WO 2009/042225 A2 4/2009

OTHER PUBLICATIONS

European Search Report EP 1315829; Dated Jun. 17, 2013; 5 pages.

*Primary Examiner* — John Goff
*Assistant Examiner* — Carson Gross
(74) *Attorney, Agent, or Firm* — Reising Ethington P.C.

(57) ABSTRACT

A fiber placement system for producing small sized flat laminates having a length and width that extends in the X and Y axes, and a constant height measured in the Z-axis includes a fixed creel for delivering fiber used by the system, and a fixed bracket attached to the creel. A fiber placement head is supported by the fixed bracket and a movable table for supporting a tool is positioned under the fiber placement head. The fiber placement head is fixed in the X, Y, and Z-axis during the application of fiber to the tool.

15 Claims, 1 Drawing Sheet

(56) References Cited

U.S. PATENT DOCUMENTS

| | | |
|---|---|---|
| 6,798,970 B1 | 9/2004 | Brown et al. |
| 6,814,822 B2 | 11/2004 | Holmes et al. |
| 6,968,883 B2 * | 11/2005 | Torres Martinez ........... 156/433 |
| 7,115,180 B2 | 10/2006 | Bruyere |
| 7,137,182 B2 | 11/2006 | Nelson |
| 2009/0301648 A1 | 12/2009 | Hogg et al. |
| 2011/0277935 A1 * | 11/2011 | Borgmann et al. ........... 156/350 |

* cited by examiner

SMALL FLAT COMPOSITE PLACEMENT SYSTEM

CROSS-REFERENCE TO RELATED APPLICATIONS

This application claims priority of U.S. provisional application Ser. No. 61/608,440 filed Mar. 8, 2012.

FIELD

The device relates to a substantially stationary fiber placement head and material delivery system for producing small flat laminates in which the material is not being manipulated by the machine as it is being dispensed and relative motion between the head and the tool is achieved by movement of the tool relative to the stationary head.

BACKGROUND

Composite placement machines for forming high strength low weight articles from high strength fiber or tape and a resin binder are well known in the art. Such machines normally comprise a composites placement head supported by an overhead gantry mechanism, or mounted on the end of a manipulator such as a robot arm. The head is maneuvered on the end of its support to apply composite material to the tool as required. In some embodiments, the tool may also be non-stationary during material application as in the case of a cylindrical form or tool that is rotated around its center axis. Such machines are large and expensive, and the use of a gantry or robot based machine to fabricate a small flat part is not an efficient use of resources.

Large composite layup machines are used to produce aircraft skins made of composite material, for example, tape laying machines for parts like wings and stabilizers, and fiber placement machines for fuselages, nacelles, and similar contoured parts. In addition to the large composite section parts, there are also a large number of small composite parts used to connect reinforcing members like frames to the skin. A common method for manufacturing these small composite parts is to use a large machine to create a flat laminate that is cut to size and draped over a tool to form the small part's final shape. Often a flat laminate is made much larger than the single small part and multiple flat laminates are cut out from the single large laminate, creating a large amount of waste material for the portions that are not useable. The use of a large machine to produce a small flat laminate is not cost efficient, and is an inefficient use of resources. Because a large number of small laminates are often formed from one large laminate, the sorting and tracking of the small laminates is difficult logistically and time consuming to manage.

It would accordingly be desirable to have a composite machine that is specifically designed for producing small flat laminates that are tailored specifically for each part.

It would also be desirable to significantly reduce the amount of waste material that is generated in the current method of making small parts.

It would further be desirable to manufacture small parts in a manner that would make the tracking of each part much easier.

It would further be desirable to employ a simplified machine that would allow much faster laydown rates and higher throughput, and would reduce the amount of capital that must be invested in the material laydown machine.

DESCRIPTION OF THE PREFERRED EMBODIMENT

Figure 1:
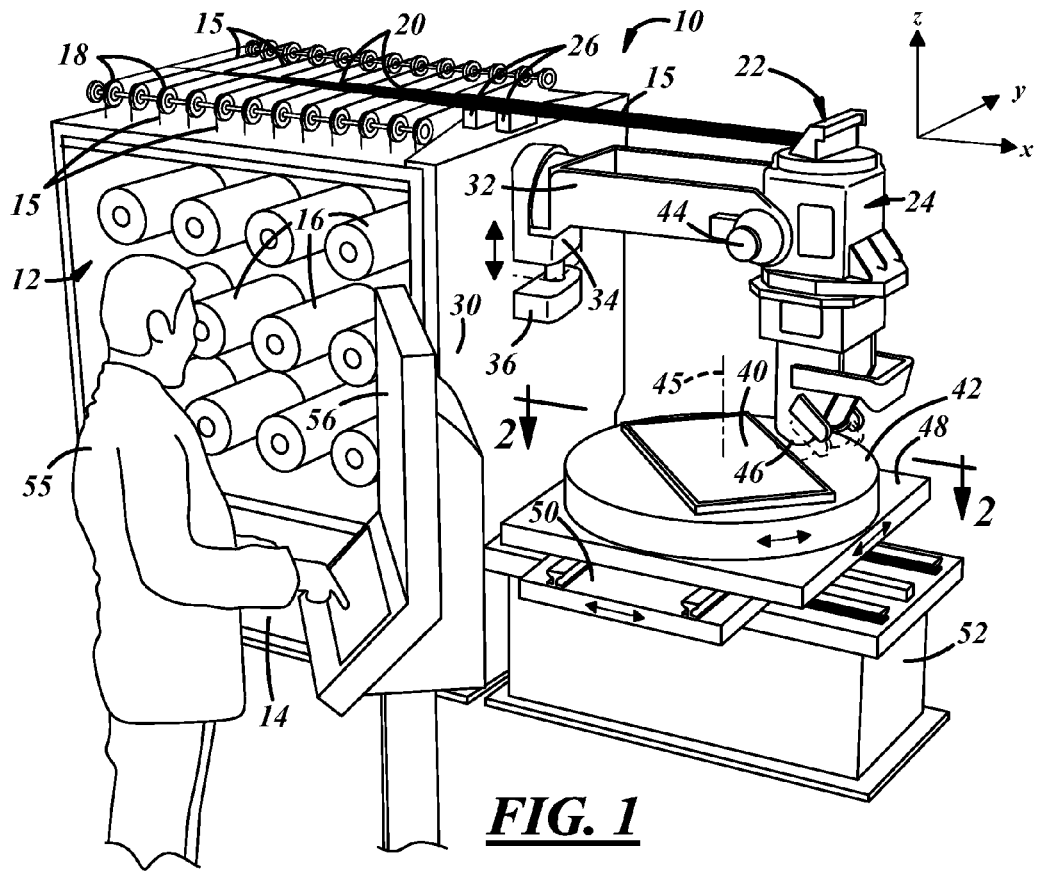
FIG. 1 is a perspective view of a composite machine for producing small flat parts.

FIG. 1 is a perspective view of a composite machine generally designated by the reference numeral 10 for producing small flat parts. The machine comprises a creel 12 that is mounted on a base 14 that rests on the floor. The creel 12 holds a number of spools 16 of material that will be used to make a part. Although it is anticipated that the material will comprise fiber in the form of slit tape or tow, tape could also be used. In the embodiment shown, the creel 12 holds twelve spools of fiber material on one side, and the creel may hold twelve additional spools of fiber material on the opposite side. Twenty four spools will allow the head to lay down twenty four lanes of material at a time. The creel may also be designed to hold twelve or sixteen spools, or more than twenty four spools. The composite material may comprise slit tape having a width of one-half inch, or other widths as desired. Positioning the spools 16 on both sides of the creel 12 reduces the footprint of the creel compared to a creel on which an equal number of spools are all supported on one side of the creel.

Fiber material 15 from the spools 16 is threaded upwards to first redirect rollers 18 mounted on top of the creel that direct the fiber to the center of the creel, and to second redirect rollers 20 that direct the fiber to a Z-axis redirect roller 22 mounted on the top of a fiber placement head 24. Guides 26 may be positioned along the fiber path as required to guide or support the fiber 15 between the redirect rollers on the creel and the Z-axis redirect roller 22.

The creel 12 has a front wall 30 and a vertical slide 34 is mounted on the front wall 30. A bracket 32 is coupled to the vertical slide 34, and the head 24 is mounted on the bracket 32. The vertical slide 34 driven by a linear actuator 36 that allows the head 24 to raise or lower a small amount in the Z-axis relative to the creel 12. The amount of vertical movement allowed by the vertical slide 34 may be 10 inches or less, and preferably is 2 inches or less. Motion of the head 24 in the Z-axis can be performed with a relatively small actuator 36 since the moving mass of the head 24 does not include a heavy wrist mechanism. There is only a small spool rewind requirement to accommodate the short vertical axis movement of the head in the Z-axis relative to the tool. A tool 40 that receives fiber composite material may be positioned on a rotary C-axis table 42 that is next to the creel and beneath the head 24. Motion of the head 24 in the Z-axis is only performed at the beginning or end of a course in order to lower or raise the compaction roller or shoe 46 at the lower end of the head 24 onto or off of the layup surface or laminate as required. Motion of the head in the Z-axis is also performed in order to initially position a tool under the head for a layup operation, and to remove a complete layup part from the C-axis table. FIG. 1 shows the roller or shoe 46 in a raised position in solid, and in a lowered position in phantom. In an alternate embodiment, the head 24 contains an internal compactor slide (not shown) that is used to raise and lower the compaction roller or shoe 46 relative to the tool 40.

The mounting of the head on the creel 12 does not allow movement of the head 24 in the X-axis or the Y-axis. The bracket 32 may be provided with a horizontal Y-axis pivot 44 that allows the head 24 to swivel about the pivot 44 for cleaning or servicing purposes. Pivoting movement of the head 24 about the Y-axis is not performed while the head is applying composite material to a tool 40.

Since the head 24 does not rotate or twist relative to the creel during composite material application, composite material is always applied to the tool 40 in a direction that is at right angles to the width dimension of the compaction roller or shoe 46.

Figure 2:
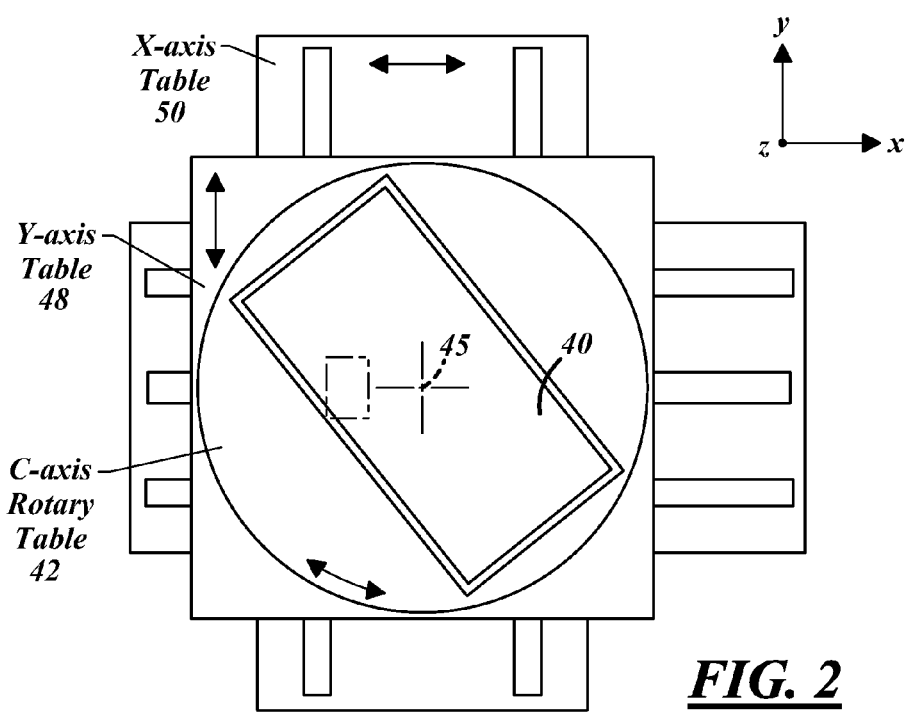
FIG. 2 is a plan view of the moving tables of the machine of FIG. 1.

FIG. 2 shows the possible motions of the X, Y, and C-axis tables. The rotary motion of the C-axis table 42 is around the vertical axis 45 of the table, parallel to the C-axis of the machine 10. The C-axis table 42 has a center axis 45 and is mounted on a Y-axis table 48, and the Y-axis table is mounted on an X-axis table 50. The X, Y, and Z-axis tables are servo driven, and are mounted on a base 52 that is supported on the floor. The rotary table 42 is positioned at a convenient height relative to an operator 55, allowing for manual placement and removal of a tool 40 on the table 42 if desired. The rotary table 42 may be placed at a height of less than six feet from the floor, and in one embodiment, the rotary table is placed at a height of no more than four feet from the floor. An operator station including a control panel 56 for controlling the operation of the machine 10 may be provided next to the machine.

In use, the head 24 is raised a small amount such as a few inches in order to allow a tool 40 to be placed on the rotary table 42. The tool may be in the form of a film that is held in place by a vacuum that is applied by the table. The vacuum will hold the film in place during lamination, and will be turned off to allow the film and the laminate to be removed at the completion of the lamination. The X, Y, and C-axis tables are actuated to orient the tool relative to the head, and the head 24 is then lowered to place the compaction shoe or roller in contact with the tool 40. The tool is then moved along the X-axis to pass the tool under the head in order to apply composite material to the tool. in the desired pattern. As the material is dispensed, the relative motion between the head and the tool is achieved by movement of the tool relative to the head once the head is positioned at the correct level over the tool. Since the tool 40 is flat, movement of the head 24 in the vertical direction is not required during the composite material placement process. Conventional cutters (not shown) in the head 24 cut the composite material 15 as the head reaches the end of a course, and the head 24 may be raised a small amount by the linear actuator 36 or the internal compactor slide to allow the X, Y, and C-axis tables to reposition the tool 40 in order for the head to lay the next course. The head 24 is then lowered to place the compaction roller or shoe 46 in contact with the tool 40, and the next course is laid by moving the tables that support the tool 40 relative to the head. Movement of the tool 40 to different positions in the X and Y-axes allows the stationary head 24 to apply composite material to different areas of the tool along the X and Y-axes. Rotation of the table around the C-axis allows the stationary head to apply composite material at various angles on the tool.

When the desired number of layers of composite material have been applied to the tool 40, the motion of the tables 42, 48, and 50 is stopped, and the head 24 raises a small amount to permit removal of the composite product. A new tool 40 is placed on the rotary table 42, and the process repeats.

The device is used to produce small flat laminates. The tool may be less than twenty-five square feet, or less than sixteen square feet, or less than ten square feet, or less than three square feet. Because the position of the head 24 is fixed relative to the creel 12 during application of fiber to the tool 40, the fiber delivery path length from the creel to the head is constant, and the path itself is simple and direct. Because the head 24 does not have to change its position during application of fiber to the head, a complicated wrist mechanism between the creel and the head is not needed. The compact creel 12 and relatively simple table system for supporting the tool provides a complete fiber placement system with a small footprint. Because the moving tables 42, 48, and 50 have a small mass compared to the normal moving parts of a fiber placement system, machine axes speeds and acceleration are high, and smaller motors than those used to maneuver a robot or gantry fiber placement system can be used for moving the tables relative to the head.

Having thus described the invention, various modifications and alterations will occur to those skilled in the art, which modifications and alterations are intended to be within the scope of the appended claims.

The invention claimed is:

1. A composite placement system for producing small sized flat laminates having a length and width that extends in the X and Y axes, and a constant height measured in the Z-axis, the system comprising:
   a fixed creel for delivering composite material used by the system, the creel having a fixed vertical front wall;
   a composite placement head coupled to the fixed vertical front wall of the creel, wherein the composite placement head has a compaction roller or shoe for applying composite material to a tool positioned under the composite placement head;
   a movable table for supporting the tool under the composite placement head,
   whereby the composite placement head is fixed in the X and Y axes and Z-axis during the application of composite material to the tool;
   a vertical slide mounted on the fixed vertical front wall of the creel;
   a bracket coupled to the vertical slide, wherein the composite placement head is mounted on the bracket; and,
   an actuator mounted on the fixed vertical front wall of the creel, whereby the actuator and the vertical slide moves the bracket, the composite placement head, and the compaction roller or shoe in the Z-axis relative to the creel and out of contact with the tool so that the tool may be moved to a new position relative to the composite placement head.

2. The composite placement system of claim 1 wherein the movable table comprises an X-axis table for moving the tool in the X-axis, whereby composite material may be applied to various portions of the tool along the X-axis by moving the table and the tool in the X-axis.

3. The composite placement system of claim 2 wherein the movable table further comprises a Y-axis table for moving the tool in the Y-axis, whereby composite material is applied to the various portions of the tool along in the Y-axis by positioning the tool under the head at various positions along the Y-axis, and then moving the table and the tool in the X-axis.

4. The composite placement system of claim 3 wherein the movable table further comprises a rotary C-axis table for rotating the tool around the vertical Z-axis, whereby composite material may be placed at various angles on the tool by rotating the tool relative to the composite placement head.

5. The composite placement system of claim 1 wherein the creel and the table is positioned no more than 6 feet above the ground.

6. The composite placement system of claim 1 wherein the creel and the table is positioned no more than 5 feet above the ground.

7. The composite placement system of claim 1 wherein the creel and the table is positioned no more than 4 feet above the ground.

8. The composite placement system of claim 1 wherein the maximum sized tool that can be placed on the table is 25 square feet.

9. The composite placement system of claim 1 wherein the maximum sized tool that can be placed on the table is 16 square feet.

10. The composite placement system of claim 1 wherein the maximum sized tool that can be placed on the table is 10 square feet.

11. The composite placement system of claim 1 wherein the maximum sized tool that can be placed on the table is 3 square feet.

12. The composite placement system of claim 1 wherein the maximum movement of the composite placement head in the Z direction is less than 12 inches.

13. The composite placement system of claim 1 wherein the maximum movement of the composite placement head in the Z direction is less than 6 inches.

14. The composite placement system of claim 1 wherein the maximum movement of the composite placement head in the Z direction is less than 3 inches.

15. The composite placement system of claim 1, wherein the creel has spools of fiber on both sides thereof to reduce the footprint of the creel.

* * * * *